United States Patent
Kishimoto et al.

(10) Patent No.: US 9,951,393 B2
(45) Date of Patent: *Apr. 24, 2018

(54) METHOD OF PRODUCING SUGAR SOLUTION

(71) Applicant: Toray Industries, Inc., Tokyo (JP)

(72) Inventors: Jumpei Kishimoto, Kanagawa (JP); Hiroyuki Kurihara, Kanagawa (JP); Atsushi Minamino, Kanagawa (JP); Katsushige Yamada, Kanagawa (JP)

(73) Assignee: Toray Industries, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/417,180

(22) PCT Filed: Aug. 8, 2013

(86) PCT No.: PCT/JP2013/071454
§ 371 (c)(1),
(2) Date: Jan. 26, 2015

(87) PCT Pub. No.: WO2014/024954
PCT Pub. Date: Feb. 13, 2014

(65) Prior Publication Data
US 2015/0203927 A1    Jul. 23, 2015

(30) Foreign Application Priority Data
Aug. 10, 2012    (JP) ................ 2012-178552

(51) Int. Cl.
*C13B 20/16*    (2011.01)
*B01D 65/06*    (2006.01)
(Continued)

(52) U.S. Cl.
CPC ............ *C13B 20/165* (2013.01); *B01D 61/58* (2013.01); *B01D 65/02* (2013.01); *B01D 65/06* (2013.01);
(Continued)

(58) Field of Classification Search
CPC ........................... C13B 20/165; B01D 65/06
See application file for complete search history.

(56) References Cited

U.S. PATENT DOCUMENTS 7,419,692 B1 *    9/2008    Kalenian ................... A23F 5/28
                                                            426/433
2002/0179545 A1 *    12/2002    Rosenberger ........ B01D 61/142
                                                            210/806
(Continued)

FOREIGN PATENT DOCUMENTS

| CN | 101624610 | 1/2010 |
| CN | 101787384 | 7/2010 |

(Continued)

OTHER PUBLICATIONS

Membrane Filtration in the Sugar Industry A. Hinkova, et al. Chemical Papers, vol. 54, pp. 375-382, 2000.*

(Continued)

*Primary Examiner* — Douglas B Call
(74) *Attorney, Agent, or Firm* — DLA Piper LLP (US)

(57) ABSTRACT

A method of producing a sugar liquid includes filtering a cellulose-derived sugar liquid through one or more separation membranes selected from the group consisting of an ultrafiltration membrane, a nanofiltration membrane and a reverse osmosis membrane and washing the separation membrane(s) after filtration with washing water containing an alkaline substance and an aromatic compound at 10° C. or more and less than 50° C.

7 Claims, 2 Drawing Sheets

(51) Int. Cl.
B01D 61/58 (2006.01)
C13K 1/02 (2006.01)
B01D 65/02 (2006.01)
B01D 61/02 (2006.01)
B01D 61/14 (2006.01)

(52) U.S. Cl.
CPC .............. *C13K 1/02* (2013.01); *B01D 61/025* (2013.01); *B01D 61/027* (2013.01); *B01D 61/145* (2013.01); *B01D 2311/26* (2013.01); *B01D 2311/263* (2013.01); *B01D 2321/02* (2013.01); *B01D 2321/08* (2013.01); *B01D 2321/16* (2013.01); *B01D 2321/162* (2013.01); *B01D 2321/164* (2013.01); *B01D 2321/20* (2013.01)

(56) References Cited

U.S. PATENT DOCUMENTS

| | | | | |
|---|---|---|---|---|
| 2005/0056600 | A1* | 3/2005 | Ranney | B01D 61/022 210/806 |
| 2009/0014386 | A1* | 1/2009 | Manttari | B01D 61/027 210/637 |
| 2011/0059497 | A1* | 3/2011 | Beckler Andersen | C12N 11/10 435/161 |
| 2011/0250637 | A1* | 10/2011 | Kurihara | B01D 61/022 435/41 |
| 2013/0266991 | A1 | 10/2013 | Kanamori et al. | |
| 2013/0312738 | A1 | 11/2013 | Kishimoto et al. | |
| 2013/0344543 | A1* | 12/2013 | Kurihara | C13K 1/02 435/99 |
| 2014/0287461 | A1 | 9/2014 | Kurihara et al. | |
| 2014/0308712 | A1* | 10/2014 | Hanakawa | B01D 61/16 435/99 |

FOREIGN PATENT DOCUMENTS

| | | | |
|---|---|---|---|
| JP | 2011-223975 A | | 11/2011 |
| WO | 2010/067785 A1 | | 6/2010 |
| WO | WO 2010/067785 | * | 6/2010 |
| WO | WO 2012/077698 | * | 12/2011 |
| WO | 2012/077697 A1 | | 6/2012 |
| WO | 2012/077698 A1 | | 6/2012 |
| WO | 2012/111794 A1 | | 8/2012 |
| WO | WO 2012/118171 | * | 9/2012 |

OTHER PUBLICATIONS

Organic Fouling and chemical cleaning of nanofiltration membranes: Measurements and mechanism Qilin Li et al Environmental Science and Technology, vol. 38, pp. 4683-4693, 2004.*

Modeling of the separation of inhibitory components from pretreated rice straw hydrolysate by nanofilitration membranes. Soumen K. Maiti et al. Bioresource Technology, V. 114, pp. 419-427, 2012 (Year: 2012).*

Chinese Office Action dated Jan. 4, 2016 of corresponding Japanese Application No. 201380042251.x, along with an English translation.

Australian Official Action dated Sep. 6, 2016, from corresponding Australian Patent Application No. 2013300500.

Notification of Reasons for Refusal dated Apr. 11, 2017, of corresponding Japanese Application No. 2013-542699, along with an English translation.

* cited by examiner

METHOD OF PRODUCING SUGAR SOLUTION

TECHNICAL FIELD

This disclosure relates to a method of producing a sugar liquid from cellulose.

BACKGROUND

In recent years, utilization of biomass as an alternative material to petroleum has drawn attention due to concerns about depletion of petroleum resources and global warming. In particular, methods of preparing sugars by hydrolysis of biomass containing polysaccharides such as starch or cellulose have been actively studied. This is because various chemical products can be produced through microbial fermentation using sugars as feedstocks.

A cellulose-derived sugar liquid contains: sugar; and as impurities, water-insoluble fine particles such as lignin, silica, calcium salts, aggregated proteins and undegraded cellulose, water-soluble macromolecules such as oligosaccharides, polysaccharides, tannin and proteins, low-molecular-weight fermentation inhibitors, inorganic salts, organic acids, and the like. As methods of removing such impurities, a method of separating fine particles into the feed side through filtration using a microfiltration membrane, a method of separating water-soluble macromolecules into the feed side through filtration using an ultrafiltration membrane, and a method of removing low-molecular weight compounds such as fermentation inhibitors from the filtrate side through a nanofiltration membrane or a reverse osmosis membrane are known (WO 2010/067785).

However, we discovered that, in a process of removing impurities from a cellulose-derived sugar liquid using a separation membrane, clogging of the separation membrane occurs as the operation continues for a long time. It could therefore be helpful to provide a method of washing to prevent a separation membrane from being clogged by impurities in a cellulose-derived sugar liquid, especially water-soluble macromolecules, in a process of producing a cellulose-derived sugar liquid using a separation membrane, thereby providing a method of efficiency removing impurities from the cellulose-derived sugar liquid.

SUMMARY

We found that membrane washing with an aqueous solution containing both an aromatic compound and an alkaline substance under the temperature range of 10° C. or more and less than 50° C. brings about a remarkable washing effect.

We thus provide:
(1) A method of producing a sugar liquid, comprising a step of filtering a cellulose-derived sugar liquid through one or more separation membranes selected from the group consisting of an ultrafiltration membrane, a nanofiltration membrane and a reverse osmosis membrane, wherein the method comprises washing the separation membrane(s) after filtration with washing water containing an alkaline substance and an aromatic compound at 10° C. or more and less than 50° C.
(2) The method of producing a sugar liquid according to (1), wherein the alkaline substance is sodium hydroxide and/or potassium hydroxide.
(3) The method of producing a sugar liquid according to (1) or (2), wherein the aromatic compound is one kind or two or more kinds selected from the group consisting of hydroxymethylfurfural (HMF), furfural, coumaric acid, ferulic acid, coumaramide, ferulamide and vanillin.
(4) The method of producing a sugar liquid according to any of (1) to (3), wherein the washing water is a derived from a filtrate obtained by passing a cellulose-derived sugar liquid through a nanofiltration membrane and/or a reverse osmosis membrane.
(5) The method of producing a sugar liquid according to any of (1) to (4), wherein the cellulose-derived sugar liquid is a cellulose-derived sugar liquid filtered through a microfiltration membrane.
(6) The method of producing a sugar liquid according to any of (1) to (5), wherein the separation membrane is washed by cross-flow filtration of the washing water through the separation membrane(s).
(7) The method of producing a sugar liquid according to (6), wherein a linear velocity of the washing water on a membrane surface is from 5 to 50 cm/sec.

It is thus possible to prevent the separation membrane from being clogged by impurities peculiar to a cellulose-derived sugar liquid at low cost while preventing membrane degradation, and therefore a clogged separation membrane can be reused in the process for producing the cellulose-derived sugar liquid.

REFERENCE SIGNS LIST

Figure 1:
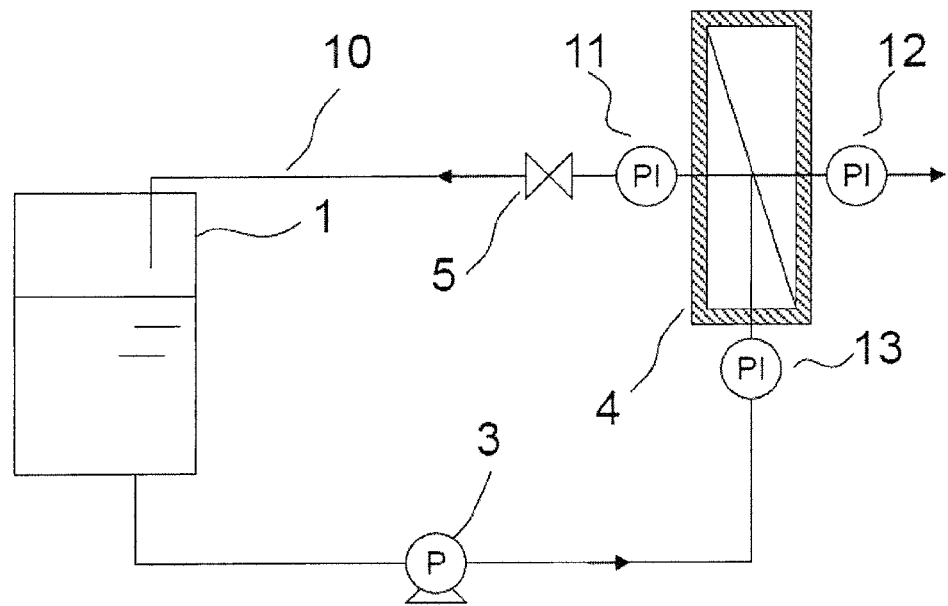
FIG. 1 is a schematic diagram of a basic constitution of a separation membrane washing device.

1 Washing water-retaining tank
3 Circulation pump
4 Cross-flow membrane module
5 Control valve
8 Washing water preparation tank
9 Washing water sending pump
10 Circulation line
11 Pressure gauge
12 Pressure gauge
13 Pressure gauge
14 Sugar liquid supply tank
15 Sugar liquid sending pump
16 Three-way valve
17 Three-way valve
21 Saccharification reaction tank
22 Slurry transfer means
23 Incubator
24 Solid-liquid separation unit
25 Solid residue
26 Incubator
27 Supply tank for ultrafiltration membrane
28 Supply pump for ultrafiltration membrane
29 Incubator 30 Ultrafiltration membrane module
31 Supply tank for nanofiltration membrane
32 Supply pump for nanofiltration membrane
33 Incubator
34 Nanofiltration membrane module
35 Supply tank for reverse osmosis membrane
36 Supply pump for reverse osmosis membrane
37 Incubator
39 Reverse osmosis membrane module
40 Membrane washing pump
41 Filtrate tank for reverse osmosis membrane
42 Filtrate tank pump for reverse osmosis membrane
43 Incubator
44 Alkali supply tank
45 Alkali sending pump

DETAILED DESCRIPTION

The cellulose-derived sugar liquid as referred to herein means a sugar liquid obtained as a result of hydrolysis of a cellulose-containing biomass. The method of hydrolysis of a cellulose-containing biomass is not specifically limited, and a method in which hydrothermal treatment, acid treatment, alkali treatment, enzyme saccharification and the like are appropriately combined is preferred. The cellulose-derived sugar liquid contains monosaccharides such as glucose, xylose and mannose; water-soluble polysaccharides such as cellobiose, cellooligosaccharide and xylooligosaccharide. Such saccharides can be used as fermentation feedstocks (carbon sources) for microbes, and can be converted by microbes into ethanol, lactic acid or amino acids.

In addition, the cellulose-derived sugar liquid contains, as other components than such saccharides, various impurities such as fine particles such as: lignin which has not been degraded in the process of hydrolysis, silica, calcium salts, aggregated proteins and undegraded cellulose; water-soluble macromolecules such as oligosaccharides, polysaccharides, tannin and proteins; low-molecular-weight fermentation inhibitors; inorganic salts; and organic acids. Such impurities can be classified into two kinds, that is, water-soluble components and water-insoluble components. It is preferred that the water-insoluble components are previously removed as solids by solid-liquid separation of the cellulose-derived sugar liquid.

Examples of the method of solid-liquid separation of the cellulose-derived sugar liquid include centrifugation, filtration through a microfiltration membrane and the like. The filtration through a microfiltration membrane makes it possible to remove even micron-sized water-insoluble components, and therefore it is desirable that the cellulose-derived sugar liquid is previously filtered through a microfiltration membrane in addition to filtration through a separation membrane in the latter stage. The microfiltration membrane for use herein may be one described in WO 2010/067785.

The cellulose-derived sugar liquid is filtered through any one or more separation membranes of an ultrafiltration membrane, a nanofiltration membrane and a reverse osmosis membrane. The filtration of the cellulose-derived sugar liquid through the separation membrane can be carried out according to the method described in WO 2010/067785. The separation membranes may also be those described in WO 2010/067785.

When the cellulose-derived sugar liquid is filtered through the above-mentioned separation membrane, the separation membrane would be clogged in long-term use thereof. The clogged separation membrane is washed with an aqueous solution containing both an aromatic compound and an alkaline substance (hereinafter this may be referred to as washing water). The step of washing the separation membrane with an aqueous solution containing both an aromatic compound and an alkaline substance (hereinafter this may be referred to as a membrane washing step) is described below.

The aromatic compound is a cyclic hydrocarbon according to the Huckel rule, that is, a compound having a cyclic hydrocarbon structure in which the number of π-electrons satisfies 4n+2 (n represents a positive integer including 0), and preferred examples thereof include hydroxymethylfurfural (HMF), furfural, coumaric acid, ferulic acid, coumaramide, ferulamide, vanillin and the like. The washing water may contain one kind alone or two or more kinds of the aromatic compounds.

The alkaline substance is a base defined by Arrhenius, that is, a substance that generates a hydroxide ion in an aqueous solution, and examples thereof include sodium hydroxide, potassium hydroxide, calcium hydroxide, barium hydroxide, sodium carbonate, potassium carbonate, calcium carbonate, ammonia and the like. As the alkaline substance, a strong base is preferable among them. The strong base means an alkaline substance to be ionized almost completely in an aqueous solution, and examples thereof include sodium hydroxide, potassium hydroxide, calcium hydroxide and barium hydroxide. As the alkaline substances to be used in the membrane washing step, sodium hydroxide and/or potassium hydroxide, which does not form an insoluble salt are preferred among them. The washing water may contain one kind alone or two or more kinds of the alkaline substances.

In the membrane washing step, a separation membrane is washed with washing water containing both an aromatic compound and an alkaline substance. An aqueous solution containing an aromatic compound alone could not provide any special membrane washing effect, and only when the solution contains an alkaline substance together therewith, the solution can efficiently remove the components, that may adhere to the surface and inside of the separation membrane and induce membrane clogging, and remarkably recover the filtration rate through the separation membrane. When an aqueous solution containing an alkaline substance alone is used as the washing water, the problem of membrane clogging could be solved in some degree, but only when the solution additionally contains an aromatic compound, the washing effect could be further remarkable.

In the membrane washing step, it is expected that calcium salts, proteins, oligosaccharides, polysaccharides, oils and fats and the like in the separation membrane-clogging components could be removed by the alkaline substance, and that the lignin-derived fermentation inhibitors and the like could be removed by the aromatic compound. As described above, an aqueous solution containing an aromatic compound alone could not provide any special washing effect, but only when the solution contains an alkaline substance together therewith, the filtration rate through the separation membrane can be recovered. The reason thereof is not clear, but probably, it may be considered that the lignin-derived fermentation inhibitors in the clogging components would have a structure covered with calcium salts, proteins, oligosaccharides, polysaccharides, oils and fats or the like, and therefore in washing with an aqueous solution containing an aromatic compound alone, the washing liquid could not reach the lignin-derived fermentation inhibitors.

The concentration range of the alkaline substance in the washing water is more preferably from 100 to 5000 ppm in total.

The concentration range of the aromatic compound in the washing water is preferably from 500 to 10000 ppm in total, more preferably from 5000 to 10000 ppm in total.

In the membrane washing step, washing is carried out by controlling the temperature range of the washing from 10 to 50° C. This is because, at lower than 10° C., the viscosity of the washing water would be extremely high and would detract from the effect of membrane washing, and at higher than 50° C., there would be no differences in membrane washing effect between the case of using an aqueous solution containing an alkaline substance alone as the washing water and the case of using an aqueous solution containing both of an alkaline substance and an aromatic compound.

The washing water may be prepared by adding the aromatic compound and the alkaline substance to water, or by adding an alkaline substance to an aqueous solution previously containing the aromatic compound. Specific examples thereof include a filtrate prepared by filtrating a cellulose-derived sugar liquid through a nanofiltration membrane and/or a reverse osmosis membrane (hereinafter referred to as NF filtrate or the like). It is known that the NF filtrate or the like contains the aromatic compound. The solution prepared by adding thereto an alkaline substance to be in a concentration range of from 0.1 to 5 g/L is preferably used as the washing water. In a production process of the cellulose-derived sugar liquid, the NF filtrate or the like is generally disposed of as a waste liquid, but reusing this as washing water for separation membranes herein brings about water saving, and this is an economical advantage.

Examples of the method of washing a separation membrane with washing water include a method of immersing a separation membrane in washing water, a method of filtering washing water through a separation membrane by dead-end filtration, a method of filtering washing water through a separation membrane by cross-flow filtration. Of those, a method of filtering washing water through a separation membrane by cross-flow filtration is preferred since formation of the flows parallel to the membrane surface allows the washing process to proceed while components causing clogging are washed away after their removal by washing water.

In membrane washing in which washing water is subjected to cross-flow filtration through a separation membrane, the linear velocity of the washing water on the membrane surface is preferably 5 to 50 cm/sec, more preferably 10 to 50 cm/sec. This is because, when the linear velocity is lower than 5 cm/sec, the washing effect on the surface of the separation membrane would be insufficient, and when the linear velocity is higher than 50 cm/sec, the washing effect could hardly change even if the linear velocity on the membrane surface is increased further more. The linear velocity of the washing water on the membrane surface may be controlled by increasing or decreasing the flow rate of the washing water sending pump.

In the membrane washing method in which washing water is subjected to cross-flow filtration through the separation membrane, to wash the insides of pores on the separation membrane, it is preferred to carry out the washing while applying a transmembrane pressure difference. However, on the other hand, when the transmembrane pressure difference given to the membrane is too high, then the components causing membrane clogging would be strongly pressed to the membrane surface so that the washing performance on the membrane surface would be thereby lowered. From this viewpoint, in the membrane washing method in which washing water is subjected to cross-flow filtration through the separation membrane, it is desirable that the transmembrane pressure difference to be applied is from 5 kPa to 1 MPa in an ultrafiltration membrane, and the transmembrane pressure difference to be applied is from 0.5 to 3 MPa in a nanofiltration membrane or reverse osmosis membrane. The transmembrane pressure difference means the difference in the pressure caused between both sides of a membrane during membrane treatment, that is, the differential pressure between the unfiltered-solution (concentrate) side and the filtrate side. When the transmembrane pressure difference during washing is less than the above-mentioned range, then the amount of the washing water capable of passing through the pores of the membrane would be extremely low so that the pores would be insufficiently washed. On the other hand, when the transmembrane pressure difference during washing is more than the above-mentioned range, then the amount of the washing water to pass through the pores of the membrane would be excessive and the consumption of the washing water would increase uneconomically. Depending on the kind of the membrane, the filtration flux of the washing water, falling within the ranges of the membrane surface linear velocity and the transmembrane pressure difference, could be generally 0.05 to 0.5 m/day.

The effect of membrane washing by the membrane washing step is evaluated based on the extent of recovery of the membrane filtration flux by the washing, which membrane filtration flux has decreased due to clogging relative to that of an unused membrane. That is, the filtration flux of each of the clogged membrane before washing and the clogged membrane after washing divided by the filtration flux of an unused membrane is defined as the filtration percentage (%), and the difference in the filtration percentage caused by the washing, or the level of the filtration percentage after the washing, was used tier evaluation of the washing effect. It would be considered that the maximum value of the filtration percentage is generally 100%. In terms of membrane treatment of a cellulose-derived sugar liquid, a membrane whose filtration percentage decreased to less than 70% was judged as unusable since the membrane is not suitable for practical use because of its low processing speed, while a membrane whose filtration percentage was not less than 70% was judged as usable for membrane treatment of a sugar liquid since the membrane is sufficiently practical in view of the processing speed. That is, the membrane washing step enables reuse of a separation membrane having a decreased filtration percentage of less than 70% for filtration of a cellulose-derived sugar liquid, by recovering the filtration percentage to not less than 70%.

Next, examples of the devices are described below. The device at least includes a washing water-retaining tank in which washing water is retained, and a circulation pump and circulation line for circulating the washing water to a membrane. It is preferred that the device includes a valve to control the pressure by the washing water on the membrane surface. The device is described below with reference to the drawings. In the drawings, the solid arrow indicates a flow of a solid or liquid, and a pipe.

Figure 2:
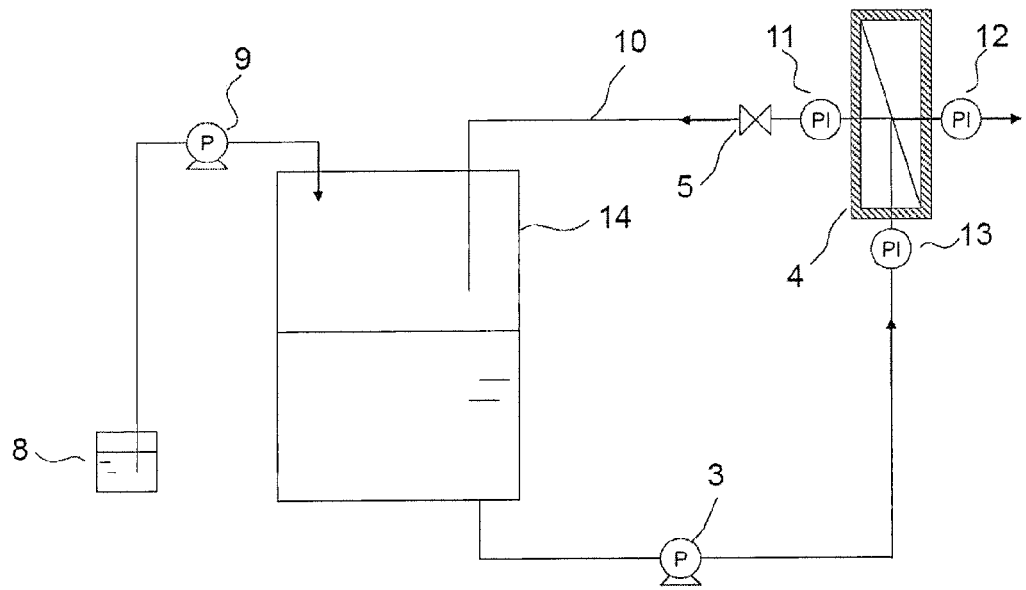
FIG. 2 is a schematic diagram of a separation membrane washing device having both a function to perform membrane treatment of a sugar liquid and a function to perform washing of a separation membrane.
Figure 3:
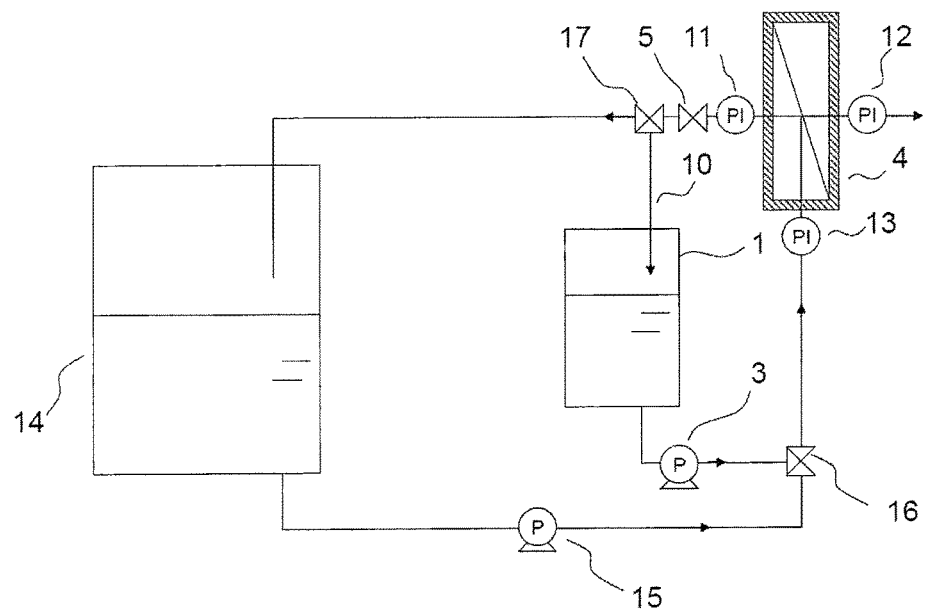
FIG. 3 is a schematic diagram of a separation membrane washing device independently having a function to perform membrane treatment of a sugar liquid and a function to perform washing of a separation membrane.
Figure 4:
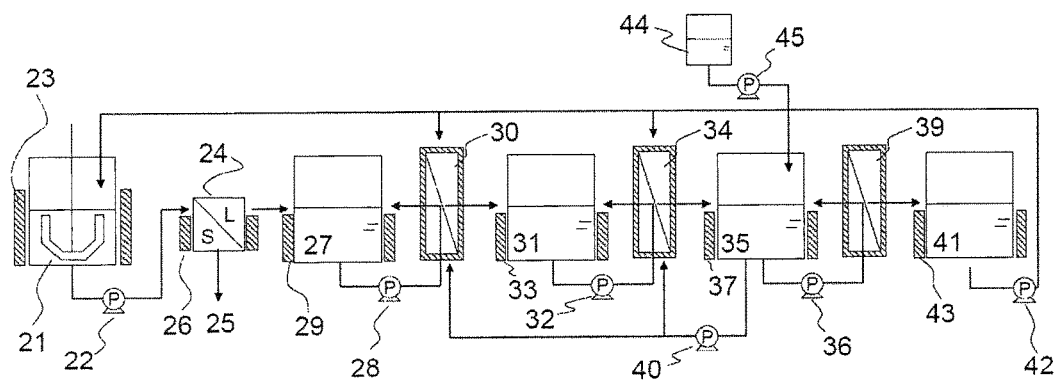
FIG. 4 is a general schematic diagram of a system for production of a cellulose-derived sugar liquid from a pretreated product of a cellulose-containing biomass.

FIG. 1 is a schematic diagram showing an example of the most basic constitution of a device. FIG. 2 is a schematic diagram showing an application example provided by including the requirements included in FIG. 1 and making the washing water-retaining tank also have a function as a sugar liquid supply tank 14 for use in membrane treatment of the sugar liquid. FIG. 3 is a schematic diagram showing an application example that includes, in addition to the requirements included in FIG. 1, an independent membrane treatment system for the sugar liquid, in which operation of valves allows switching between the membrane treatment step and the membrane washing step. FIG. 4 is a general schematic view of a system for production of a cellulose-derived sugar liquid from a pretreated product of a cellulose-containing biomass.

The device in FIG. 1 is described in detail. Water, an aromatic compound and an alkaline substance are put in the washing water-retaining tank 1 to retain washing water therein. The washing water retained in the washing water-retaining tank 1 is supplied to a cross-flow membrane module 4 by a circulation pump 3 capable of controlling the flow rate of the liquid. Thereafter, the washing water passes through a circulation line 10 and returns again to the washing water-retaining tank. The transmembrane pressure difference can be controlled by the degree of opening/closing of a control valve 5 and by controlling the flow rate in the circulation pump. The transmembrane pressure difference can be calculated using pressure gauges 11 to 13. That is, the difference between the mean of the values measured by the pressure gauge 11 and the pressure gauge 13 and the value measured by the pressure gauge 12 can be regarded as the transmembrane pressure difference.

The device in FIG. 2 is described below in detail. The device shown in FIG. 2 has both a function to perform membrane treatment of sugar liquid and a function to perform membrane washing. The sugar liquid supply tank 14 that retains a sugar liquid during the membrane treatment of sugar liquid is used also as a washing water-retaining tank during washing of the membrane. Washing water is prepared by adding water, an aromatic compound and an alkaline substance to the washing water preparation tank 8, and is put into the sugar liquid supply tank via the washing water sending pump 9. During washing, the washing water retained in the sugar liquid supply tank 14 is supplied to a cross-flow membrane module 4 by a circulation pump 3 that is capable of controlling the flow rate of the liquid. Thereafter, the washing water passes through a circulation line 10 and returns again to the washing water-retaining tank. The transmembrane pressure difference can be controlled by the degree of opening/closing of a control valve 5 and by controlling the flow rate in the circulation pump. The transmembrane pressure difference can be calculated using pressure gauges 11 to 13. That is, the difference between the mean of the values measured by the pressure gauge 11 and the pressure gauge 13 and the value measured by the pressure gauge 12 can be regarded as the transmembrane pressure difference.

The device in FIG. 3 is described below in detail. The device shown in FIG. 3 separately has a function to perform membrane treatment of saccharides and a function to perform membrane washing, and operation of three-way valves 16 and 17 allows switching between these functions. In the membrane treatment of the sugar liquid, the sugar liquid fed to a sugar liquid supply tank 14 is sent to a cross-flow membrane module 4 by a sugar liquid sending pump 15. In terms of membrane washing, the device includes the washing water-retaining tank 1 for retaining washing water therein. The washing water retained in the washing water-retaining tank 1 is supplied to a cross-flow membrane module 4 by a circulation pump 3 that is capable of controlling the flow rate of the liquid. Thereafter, the washing water passes through a circulation line 10 and returns again to the washing water-retaining tank. The transmembrane pressure difference can be controlled by the degree of opening/closing of a control valve 5 and by controlling the flow rate in the circulation pump. The transmembrane pressure difference can be calculated using pressure gauges 11 to 13. That is, the difference between the mean of the values measured by the pressure gauge 11 and the pressure gauge 13 and the value measured by the pressure gauge 12 can be regarded as the transmembrane pressure difference.

The device in FIG. 4 is described below in detail. The cellulose-containing biomass is mixed with a saccharifying enzyme in a saccharification reaction tank 21, to perform hydrolysis. The slurry after the saccharification reaction is transferred by a slurry transfer means 22 to a solid-liquid separation device 24, and separated into a solid residue 25 and a primary sugar liquid. The primary sugar liquid is retained in a supply tank 27 for an ultrafiltration membrane, and then supplied by a supply pump 28 for an ultrafiltration membrane to an ultrafiltration membrane module 30, in which the primary sugar liquid is separated into a macromolecule concentrate and a secondary sugar liquid (filtrate). The macromolecule concentrate is circulated by the supply tank 27 for an ultrafiltration membrane and the supply pump 28 for an ultrafiltration membrane, to be further concentrated. The secondary sugar liquid is retained in a supply tank 31 for a nanofiltration membrane, and then supplied by a supply pump 32 for a nanofiltration membrane to a nanofiltration membrane module 34, in which the secondary sugar liquid is separated into a concentrated sugar liquid and an NF filtrate. The concentrated sugar liquid is circulated by the supply tank 31 for a nanofiltration membrane and the supply pump 32 for a nanofiltration membrane, to be further concentrated. The NF filtrate is retained in a supply tank 35 for a reverse osmosis membrane, and then supplied by a supply pump 36 for a reverse osmosis membrane to a reverse osmosis membrane module 39, in which the NF filtrate is separated into an RO concentrate and an RO filtrate. The RO concentrate is circulated by the supply tank 35 for a reverse osmosis membrane and the supply pump 36 for a reverse osmosis membrane, to be further concentrated. The RO concentrate retained in the reverse osmosis membrane supply tank is an aqueous solution containing an aromatic compound, and an alkali is put into the solution from the alkali supply tank 44 and via the alkali sending pump 45, thereby preparing washing water in the reverse osmosis membrane supply tank. The washing water is returned from the supply tank 35 for a reverse osmosis membrane by a membrane washing pump 40 to the ultrafiltration membrane module 30 or the nanofiltration membrane module 34, and reused for washing of the membrane modules. The RO filtrate is retained in a filtrate tank 41 for a reverse osmosis membrane, and, as required, returned by a filtrate tank pump 42 for a reverse osmosis membrane to the saccharification reaction tank 21, ultrafiltration membrane module 30 or nanofiltration membrane module 34, to be reused for controlling the concentration of solids in the saccharification reaction and washing the membrane modules. The saccharification reaction tank 21, the solid-liquid separation unit 24, the supply tank 27 for an ultrafiltration membrane, the supply tank 31 for a nanofiltration membrane, the supply tank 35 for a reverse osmosis membrane, and the filtration tank 41 for a reverse osmosis membrane are separately includes an incubator (23, 26, 29, 33, 37 and 43, respectively), and each step can therefore be carried out while the temperature of the sugar liquid is maintained.

EXAMPLES

Examples are described below, but this disclosure is not limited thereto.

Reference Example 1

Method of Preparing Clogged Membrane

To evaluate the effect of membrane washing accurately, many membranes with the same contamination condition need to be prepared. A method of preparing such membranes is described below.

As a cellulose-containing biomass, rice straw that was pulverized to 2 mm was used. The cellulose-containing biomass was immersed in water, and processed using an autoclave (manufactured by Nitto Koatsu Co., Ltd.) at 180° C. for 5 minutes with stirring. The pressure at that time was 10 MPa. Thereafter, the processed biomass component was subjected to solid-liquid separation by centrifugation (3000 G). To the solution component, "Accellerase DUET" (manufactured by Genencor Kyowa Co. Ltd.) was added, and the reaction was allowed to proceed at 50° C. for 24 hours to obtain a sugar liquid derived from the solution component. Thereafter, treatment with a filter press (manufactured by Yabuta Industries Co., Ltd., MO-4) was carried out to remove undegraded cellulose and lignin, to obtain a biomass-derived sugar liquid. Further, by subjecting the sugar liquid to filtration through a microfiltration membrane with a pore size of 0.22 µm, micron-sized water-insoluble components were removed. The thus obtained sugar liquid in an amount of about 40 L was subjected to filtration through a spiral membrane module composed of an ultrafiltration membrane, nanofiltration membrane or reverse osmosis membrane. Irrespective of the type of the membrane, the operation temperature was set to 50° C. and the membrane surface linear velocity was set to 20 cm/sec. The operation pressure under which the filtration was carried out was 0.1 MPa in the case of an ultrafiltration membrane, 2 MPa in the case of a nanofiltration membrane, and 4 MPa in the case of a reverse osmosis membrane. The operation was stopped when the filtration flux decreased to not more than 0.05 m/day. Each spiral membrane module whose filtration flux was decreased by such an operation was disassembled, and the membrane portion was cut into the form of a sheet with a size of 190 mm×140 mm.

In the Examples below, the thus obtained sheet-shaped membranes were subjected to washing tests and permeation tests using a compact flat membrane unit "SEPA CF-II" (manufactured by GE Osmonics; effective membrane area, 140 cm$^2$) that can be used as a compact filtration tester for a spiral membrane module.

Reference Example 2

Method of Measuring Filtration Flux and Method of Evaluating Membrane Washing Effect The filtration flux measurement was carried out at a temperature of 25° C. and a membrane surface linear velocity of 20 cm/sec. for both the ultrafiltration membrane and the reverse osmosis membrane. The operation pressure was set to 0.1 MPa in the case of an ultrafiltration membrane, 2 MPa in the case of a nanofiltration membrane, and 4 MPa in the case of a reverse osmosis membrane. Under these conditions, pure water was filtered for 1 minute, and the mean filtration flux (m/day) during this process was measured. At this time, circulation of the cross flow was not carried out, and the cross flow was directly discharged. As a membrane separation device, a compact flat membrane unit corresponding to the spiral module described in Reference Example 1 was used.

In the Examples below, the filtration flux was measured by the above-described operation for each of an unused membrane, a clogged membrane before washing, and a clogged membrane after washing. The measured value of the filtration flux for each of the clogged membrane before washing and the clogged membrane after washing divided by the measured value of the filtration flux for the unused membrane was defined as the filtration percentage (%), and recovery of the filtration percentage by the washing, or the level of the filtration percentage after the washing, was used for evaluation of the membrane washing effect. It should be noted that the maximum value of the filtration percentage is theoretically 100%.

Reference Example 3

Analysis of Aromatic Compounds by HPLC

The concentrations of HMF, furfural, coumaric acid, ferulic acid, coumaramide, ferulamide and vanillin in the aqueous solution were quantified under the following HPLC conditions based on comparison with standard samples. Since standard samples for coumaramide and ferulamide were not commercially available, they were obtained by custom synthesis (manufacturer: VSN).

Device: high-performance liquid chromatograph "Lachrom elite" (manufactured by Hitachi, Ltd.)
Column: "Synergi 2.5 µm Hydro-RP 100A" (manufactured by Phenomenex)
Detection method: Diode Array detector
Flow rate: 0.6 mL/min.
Temperature: 40° C.

Example 1

Washing of Ultrafiltration Membrane with Aqueous Solution Containing Aromatic Compound and Alkaline Substance For a heat-resistant ultrafiltration membrane (manufactured by DESAL; "HWS UF" series) having a decreased filtration flux, which had been obtained according to the method in Reference Example 1, membrane washing was carried out under the following 11 conditions in total: pure water was used as washing water (condition 1); an aqueous solution containing sodium hydroxide alone in a concentration of 0.5 g/L was used as washing water (condition 2); an aqueous solution containing furfural alone in a concentration of 0.5 g/L was used as washing water (condition 3); an aqueous solution containing sodium hydroxide in a concentration of 0.5 g/L and containing any one aromatic compound selected from the group of HMF, furfural, coumarin acid, ferulic acid, coumaramide, ferulamide and vanillin in a concentration of 0.5 g/L, respectively, was used as washing water (conditions 4 to 10); and an aqueous solution containing furfural in a concentration of 0.5 g/L and containing potassium hydroxide in a concentration of 0.5 g/L was used as washing water (condition 11). Using 2 L of the washing water, the membrane washing was carried out for 20 minutes at a washing water temperature of 25° C., under an operation pressure of 0.1 MPa and at a membrane surface linear velocity of 30 cm/sec with circulation of the cross flow. As a membrane separation device, a compact flat membrane unit corresponding to the spiral module described in Reference Example 1 was used. The filtration flux was measured by the method in Reference Example 2 before and after membrane washing. The filtration flow rate before membrane washing was regarded as the same among all conditions, and the value measured for one of the conditions was regarded as the filtration flux before membrane washing common to all conditions. Values of the filtration percentage converted from the filtration flux according to Reference Example 2 are shown in Table 1. The measured value of the filtration flux of the unused membrane was 0.258 m/day. As is evident from Table 1, when membrane washing was carried out with pure water, the filtration percentage was remarkably recovered, as compared with that before washing, but was still insufficient for membrane reuse. When the aqueous solution containing furfural alone was used, the recovery of the filtration percentage was similar to that in the case where pure water was used, and any special effect was not provided. When the aqueous solution containing sodium hydroxide alone was used, the recovery of the filtration rate was further improved as compared with the case where pure water was used, but was still insufficient for membrane reuse. On the other hand, when the aqueous solution containing both an aromatic compound and an alkaline substance was used, the filtration percentage was markedly recovered in any combination, and was sufficient for membrane reuse.

TABLE 1

| | Alkaline Substance | Aromatic Compound | Filtration percentage before washing % | Filtration percentage after washing % |
|---|---|---|---|---|
| Condition 1 | none | None | 27 | 48 |
| Condition 2 | sodium hydroxide | None | | 66 |
| Condition 3 | none | Furfural | | 49 |
| Condition 4 | sodium hydroxide | HMF | | 81 |
| Condition 5 | sodium hydroxide | Furfural | | 84 |
| Condition 6 | sodium hydroxide | coumaric acid | | 83 |
| Condition 7 | sodium hydroxide | ferulic acid | | 85 |
| Condition 8 | sodium hydroxide | coumaramide | | 81 |
| Condition 9 | sodium hydroxide | ferulamide | | 83 |
| Condition 10 | sodium hydroxide | Vanillin | | 80 |
| Condition 11 | potassium hydroxide | Furfural | | 84 |

Example 2

Washing of Nanofiltration Membrane with Aqueous Solution Containing Aromatic Compound and Alkaline Substance For a heat-resistant nanofiltration membrane (manufactured by DESAL; "HWS NF" series) having a decreased filtration flux, which had been obtained according to the method in Reference Example 1, membrane washing was carried out in the same manner as in Example 1 except that the operation pressure was changed to 2 MPa. Values of the filtration percentage converted from the filtration flux according to Reference Example 2 are shown in Table 2. The measured value of the filtration flux through the unused membrane was 0.246 m/day. As a result, as is evident from Table 2, when membrane washing was carried out with pure water, the filtration percentage was remarkably recovered, as compared with that before washing, but was still insufficient for membrane reuse. When the aqueous solution containing furfural alone was used, the recovery of the filtration percentage was similar to that when pure water was used, and any special effect was not provided. When the aqueous solution containing sodium hydroxide alone was used, the recovery of the filtration percentage was further improved as compared to where pure water was used, but was still insufficient for membrane reuse. On the other hand, when the aqueous solution containing both an aromatic compound and an alkaline substance was used, the filtration percentage was markedly recovered in any combination, and was sufficient for membrane reuse.

TABLE 2

| | Alkaline Substance | Aromatic Compound | Filtration percentage before washing % | Filtration percentage after washing % |
|---|---|---|---|---|
| Condition 1 | none | none | 30 | 55 |
| Condition 2 | sodium hydroxide | none | | 68 |
| Condition 3 | none | furfural | | 56 |
| Condition 4 | sodium hydroxide | HMF | | 83 |
| Condition 5 | sodium hydroxide | furfural | | 85 |
| Condition 6 | sodium hydroxide | coumaric acid | | 86 |
| Condition 7 | sodium hydroxide | ferulic acid | | 82 |
| Condition 8 | sodium hydroxide | coumaramide | | 79 |
| Condition 9 | sodium hydroxide | ferulamide | | 84 |
| Condition 10 | sodium hydroxide | vanillin | | 82 |
| Condition 11 | potassium hydroxide | furfural | | 85 |

Example 3

Washing of Reverse Osmosis Membrane with Aqueous Solution Containing Aromatic Compound and Alkaline Substance For a heat-resistant reverse osmosis membrane (manufactured by DESAL; "HWS RO" series) having a decreased filtration flux, which had been processed according to the method in Reference Example 1, membrane washing was carried out in the same manner as in Example 1 except that the operation pressure was changed to 4 MPa. Values of the filtration percentage converted from the filtration flux according to Reference Example 2 are shown in Table 3. The measured value of the filtration flux through the unused membrane was 0.245 m/day. As a result, as is evident from Table 3, when membrane washing was carried out with pure water, the filtration rate was remarkably recovered as compared with that in the case before washing, but was still insufficient for membrane reuse. When an aqueous solution containing furfural alone was used, the recovery of the filtration rate was similar to that when pure water was used, and any special effect was not provided. When an aqueous solution containing sodium hydroxide alone was used, the recovery of the filtration rate was further improved as compared with that when pure water was used, but was still insufficient for membrane reuse. On the other hand, when an aqueous solution containing both an aromatic compound and an alkaline substance was used, the filtration rate was markedly recovered in any combination, and was sufficient for membrane reuse.

TABLE 3

| | Alkaline Substance | Aromatic Compound | Filtration percentage before washing % | Filtration percentage after washing % |
|---|---|---|---|---|
| Condition 1 | none | none | 28 | 53 |
| Condition 2 | sodium hydroxide | none | | 67 |
| Condition 3 | none | furfural | | 53 |
| Condition 4 | sodium hydroxide | HMF | | 83 |
| Condition 5 | sodium hydroxide | furfural | | 82 |
| Condition 6 | sodium hydroxide | coumaric acid | | 81 |
| Condition 7 | sodium hydroxide | ferulic acid | | 86 |
| Condition 8 | sodium hydroxide | coumaramide | | 76 |
| Condition 9 | sodium hydroxide | ferulamide | | 81 |
| Condition 10 | sodium hydroxide | vanillin | | 83 |
| Condition 11 | potassium hydroxide | furfural | | 80 |

Example 4

Influence of Washing Temperature on Membrane Washing Effect

Membrane washing was carried out according to the method under the conditions 2 and 5 in Example 2, except that the temperature condition was changed as follow (12 conditions in total): 10° C., 25° C., 40° C., 50° C., 60° C. and 70° C. Values of the filtration percentage converted from the filtration flux according to Reference Example 2 are shown in Table 4. The measured value of the filtration flux through the unused membrane was 0.246 m/day. As a result, as is evident from Table 4, in the case of conditions under the temperature of 50° C. or more, the filtration percentage was sufficiently recovered even when the aqueous solution containing sodium hydroxide alone was used as washing water, and little difference was seen as compared with the case where the aqueous solution containing both sodium hydroxide and furfural. On the other hand, in the case of conditions under the temperature of less than 50° C., the recovery of the filtration percentage was insufficient when the aqueous solution containing sodium hydroxide alone was used as washing water, and sufficient washing effect could be obtained only when the aqueous solution containing both sodium hydroxide and furfural was used as washing water.

TABLE 4

| Alkaline Substance | Aromatic Compound | Temperature (° C.) | | | | | |
|---|---|---|---|---|---|---|---|
| | | 10 | 25 | 40 | 50 | 60 | 70 |
| sodium hydroxide | none | 65 | 68 | 69 | 82 | 85 | 86 |
| sodium hydroxide | furfural | 82 | 85 | 86 | 86 | 87 | 87 |

Example 5

Influence of Membrane Surface Linear Velocity on Membrane Washing Effect

A heat-resistant nanofiltration membrane (manufactured by DESAL; "HWS NF" series) having a decreased filtration flux, which had been obtained according to the method in Reference Example 1, membrane conditions were carried out under the same condition as the condition 5 in Example 2 except that the membrane surface linear velocity condition was changed to the following 6 conditions in total: 5 cm/sec, 10 cm/sec, 30 cm/sec, 50 cm/sec, 70 cm/sec and 90 cm/sec. Values of the filtration percentage converted from the filtration flux according to Reference Example 2 are shown in Table 4. The measured value of the filtration flux through the unused membrane was 0.246 m/day. As a result, as is evident from Table 5, the recovery of the filtration percentage was higher at a higher membrane surface linear velocity, and reached the upper limit at 50 cm/sec or more.

TABLE 5

| Membrane Surface Linear Velocity (cm/sec) | Filtration Percentage after washing (%) |
|---|---|
| 5 | 80 |
| 10 | 83 |
| 30 | 85 |
| 50 | 87 |
| 70 | 87 |
| 90 | 88 |
| Filtration Percentage before washing (%) | 30 |

Example 6

Influence of Aromatic Compound Concentration on Washing Effect

Membrane washing was carried out according to the same method as that under the condition 5 in Example 2, except that the furfural concentration in the washing water was changed to the following 6 conditions in total: 500 ppm, 1000 ppm, 3000 ppm, 5000 ppm, 7000 ppm and 10000 ppm.

Values of the filtration percentage converted from the filtration flux according to Reference Example 2 are shown in Table 6. The measured value of the filtration flux through the unused membrane was 0.246 m/day. As is evident from Table 6, the membrane washing effect increased with the increase in the furfural concentration, and the membrane washing effect reached the highest at a concentration of 5 g/L or more.

TABLE 6

| Furfural ppm | Filtration Percentage after washing (%) |
| --- | --- |
| 500 | 85 |
| 1000 | 87 |
| 3000 | 88 |
| 5000 | 90 |
| 7000 | 91 |
| 10000 | 90 |
| Filtration Percentage before washing (%) | 30 |

Example 7

Membrane Washing with Filtrate Obtained by Filtration of Cellulose-Derived Sugar Liquid Through Nanofiltration Membrane According to the method of Reference Example 1, a cellulose-derived sugar liquid was filtered through a nanofiltration membrane to give an NF filtrate. Further, a part of the NF filtrate was filtered through a reverse osmosis membrane ("UTC-80," manufactured by Toray Industries) at room temperature under an operation pressure of 6 MPa to prepare RO concentrates in which the component concentration increased to about 6 times, 10 times and 20 times, respectively (hereinafter these are referred to as 6-times NF filtrate, 10-times NF filtrate, 20-times NF filtrate, respectively). These liquids were analyzed for the aromatic compound concentration therein according to the method of Reference Example 3, and the results are shown in Table 7. In addition, under the same condition as in Example 2 except that the washing water was changed to those prepared by adding sodium hydroxide to the NF filtrate, the 6-times NF filtrate, the 10-times NF filtrate and the 20-times NF filtrate to be each in an amount of 0.5 g/L. Values of the filtration percentage converted from the filtration flux according to Reference Example 2 are shown in Table 8. The measured value of the filtration flux through the unused membrane was 0.246 m/day. As is evident from Tables 7 and 8, the membrane washing effect was higher at a higher aromatic compound concentration.

TABLE 8

| Washing water | Filtration Percentage after washing (%) |
| --- | --- |
| (Comparison) Pure water | 55 |
| NF Filtrate | 83 |
| 6-Times NF Filtrate | 90 |
| 10-Times NF Filtrate | 92 |
| 20-Times NF Filtrate | 91 |

Industrial Applicability

A method of washing a separation membrane in a method of producing a sugar liquid that includes a step of filtering a cellulose-derived sugar liquid through any one or more separation membranes of an ultrafiltration membrane, a nanofiltration membrane and a reverse osmosis membrane can be used.

The invention claimed is:
1. A method of producing a sugar liquid comprising:
    filtering a cellulose-derived sugar liquid through one or more separation membranes selected from the group consisting of a nanofiltration membrane and a reverse osmosis membrane; and
    washing the separation membrane(s) after filtration with a washing water containing both an alkaline substance and an aromatic compound at 10° C. or more and less than 50° C.,
    wherein the aromatic compound is one or more selected from the group consisting of coumaric acid, ferulic acid, coumaramide, ferulamide and vanillin, and
    a concentration of the aromatic compound in the washing water is 500 to 10,000 ppm.
2. The method of producing a sugar liquid according to claim 1, wherein the alkaline substance is sodium hydroxide and/or potassium hydroxide.
3. The method of producing a sugar liquid according to claim 1, wherein the washing water further comprises at least one of hydroxymethylfurfural (HMF) and furfural.
4. The method of producing a sugar liquid according to claim 1, wherein the washing water is a derived from a filtrate obtained by passing a cellulose-derived sugar liquid through a nanofiltration membrane and/or a reverse osmosis membrane.
5. The method of producing a sugar liquid according to claim 1, wherein the cellulose-derived sugar liquid is a cellulose-derived sugar liquid filtered through a microfiltration membrane.
6. The method of producing a sugar liquid according to claim 1, wherein the separation membrane is washed by cross-flow filtration of the washing water through the separation membrane(s).

TABLE 7

| Washing Water | HMF (ppm) | Furfural (ppm) | Coumaric acid (ppm) | Ferulic acid (ppm) | Coumaramide (ppm) | Ferulamide (ppm) | Vanillin (ppm) | Total (ppm) |
| --- | --- | --- | --- | --- | --- | --- | --- | --- |
| NF Filtrate | 47 | 175 | 188 | 149 | 1 | 3 | 7 | 570 |
| 6-Times NF Filtrate | 277 | 1070 | 1074 | 864 | 6 | 15 | 44 | 3349 |
| 10-Times NF Filtrate | 461 | 1788 | 1828 | 1474 | 9 | 25 | 72 | 5658 |
| 20-Times NF Filtrate | 926 | 3577 | 3769 | 2889 | 19 | 51 | 143 | 11373 |

7. The method of producing a sugar liquid according to claim 6, wherein a linear velocity of the washing water on a membrane surface is 5 to 50 cm/sec.

\* \* \* \* \*